United States Patent [19]

Seeley et al.

[11] 3,893,285
[45] July 8, 1975

[54] ASPARAGUS SNAPPER

[75] Inventors: Ann M. Seeley, Paw Paw; H. Eldon McKibben, Grand Junction, both of, MI

[73] Assignee: Ann M. Seeley, Paw Paw, Mich.

[22] Filed: Dec. 3, 1973

[21] Appl. No.: 421,449

[52] U.S. Cl.............................. 56/327 A; 56/327 A
[51] Int. Cl............................................ A01d 45/00
[58] Field of Search.................. 56/327 A, 219–227, 56/400.02, 13.2, 400.13; 15/79, 82, 83

[56] References Cited
UNITED STATES PATENTS

| | | | |
|---|---|---|---|
| 431,146 | 7/1890 | Tellier | 15/79 |
| 929,109 | 7/1909 | Rappelee | 15/79 |
| 998,517 | 7/1911 | Humm | 15/79 |
| 1,224,349 | 5/1917 | Yessne | 15/79 X |
| 2,209,997 | 8/1940 | Nordhougen | 56/220 |
| 2,301,873 | 11/1942 | Heth et al. | 56/220 |
| 2,457,490 | 12/1948 | Press | 56/220 |
| 3,452,525 | 7/1969 | Francis | 56/327 A |
| 3,653,194 | 4/1972 | Lachman | 56/327 A |

*Primary Examiner*—Russell R. Kinsey
*Attorney, Agent, or Firm*—Woodhams, Blanchard and Flynn

[57] ABSTRACT

A machine for harvesting asparagus stalks and adapted to be moved in a forward horizontal direction. The machine has a wheel supported frame and a cylindrically shaped paddle wheel having a plurality of flexible paddles thereon rotatable therewith. A support bar is secured to the frame and extends beneath the paddle wheel configuration and is vertically spaced from the tips of the flexible paddles. A stationary slide is secured to the support bar and extends in an arcuate path between a support bar and a collecting bin which serves to collect the severed asparagus stalks. A selectively variable speed drive is provided, which drive is independent of the forward speed of the wheel supported frame. Transmission means are provided for operatively connecting the drive to the paddle wheel configuration to effect a rotational movement thereof so that the lowermost ones of the paddles are moved at a selected reverse horizontal velocity depending upon the condition of the asparagus stalks at the time of harvest.

6 Claims, 9 Drawing Figures

PATENTED JUL 8 1975 3,893,285

SHEET 1

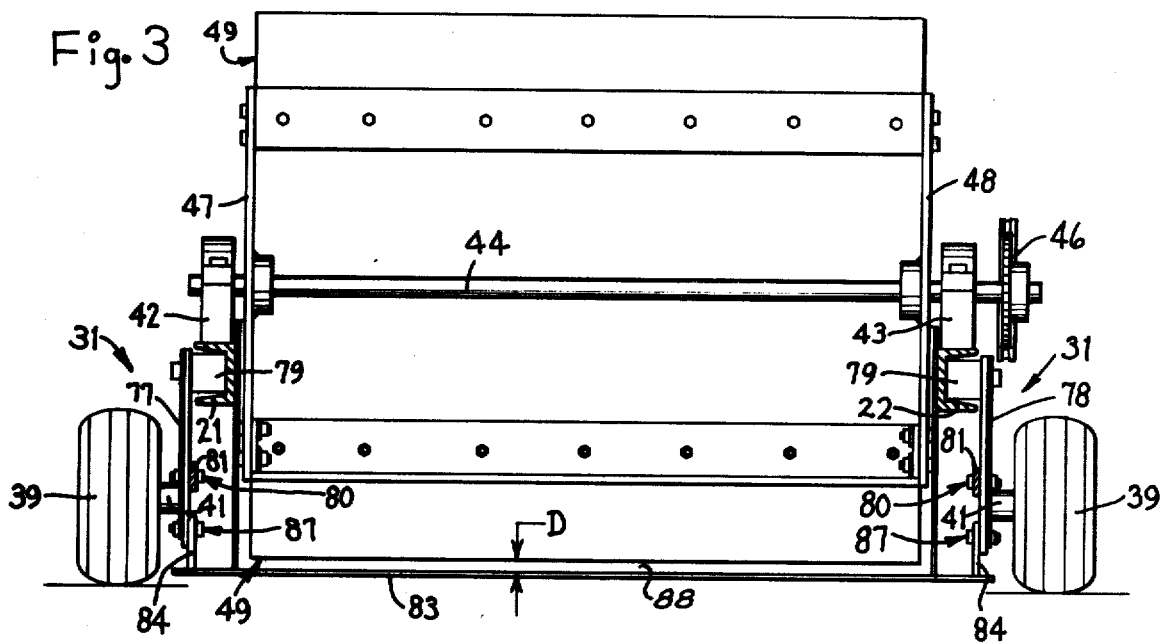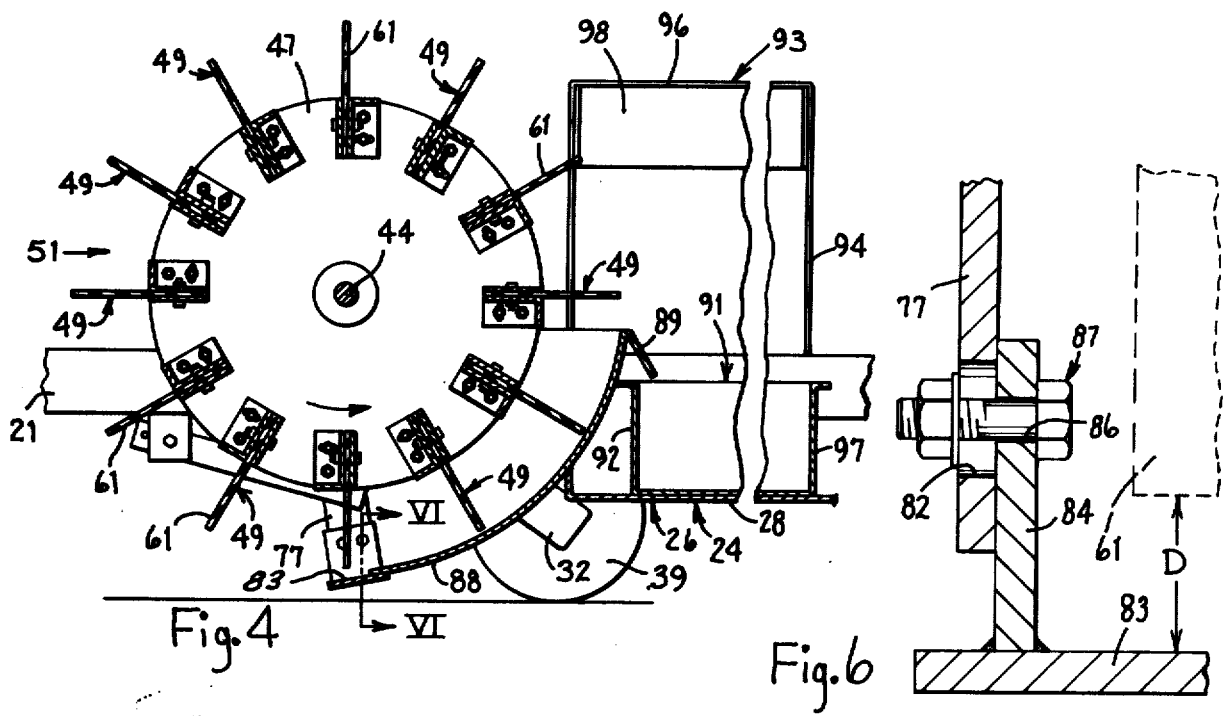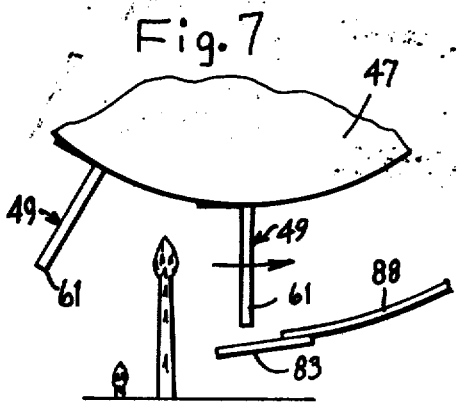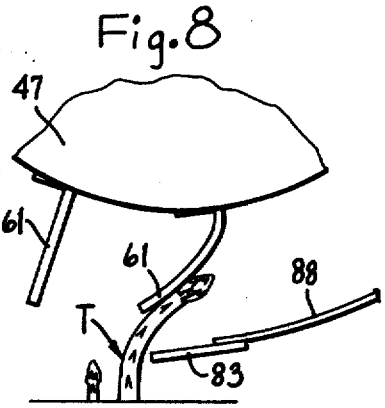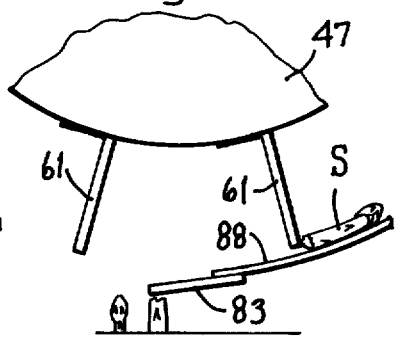

ASPARAGUS SNAPPER

FIELD OF THE INVENTION

The present invention relates to harvesters, and more particularly, relates to asparagus harvesters particularly designed to snap rather than cut, tear or sheer the delicate stalks or spears.

BACKGROUND OF THE INVENTION

Many different types of asparagus harvesters have been disclosed in the art for harvesting asparagus as well as other vegetables. Many types of vegetables are of such nature that they may be picked by any type of machine utilizing processes such as sheering, breaking, tearing or cutting. However, certain vegetables, such as asparagus stalks, are very fragile. Consequently, the spears thereof snap off quite easily if properly picked. As a result, several unusual problems are encountered in the harvest of asparagus.

One of the problems encountered is the change in height of the location of the tender part of the asparagus stalk as the day progresses. Further, if the day is hot and there is little moisture in the ground, the asparagus stalks become limp and more difficult to harvest. That is, the conditions of the asparagus stalks in the morning hours are much different than the asparagus stalks during the afternoon hours. As a result, the grower must be ever alert of the change in the condition of the asparagus stalks, particularly the location of the tender part so that the proper adjustments can be made to the machine to facilitate an efficient harvest of the asparagus stalks. Thus, the grower must be able to have a wide range of adjustments on the harvesting machine available to him to facilitate the constantly varying conditions of the asparagus stalks during the day of harvest.

This development is considered to be a substantial advance in the art due to the fact that canneries and frozen food processors require that the tougher portion of the stalk be separated from the tender edible portion. When the harvested asparagus contains the tough part thereon, as is oftentimes achieved by cutting, it is necessary that the tough part by removed from the stalk prior to a further processing thereof. As a result, the value of the harvested asparagus is less if it has the tough portions thereon and more valuable if the tough portions are left in the field. Thus, most asparagus farmers have resorted to the employment of large numbers of persons to laboriously pick the stalks by hand by snapping them between the fingers or by grasping the tip of the stalk and bending same until it snaps at the tender point. In the period of maximum growth, a row of asparagus should be picked everyday to obtain the optimum stalk length. The labor problems in such an operation are obvious.

Accordingly, it is an object of this invention to provide an apparatus for harvesting asparagus stalks without damaging the stalks or spears thereof. It is a further object to provide such an apparatus which can be adjusted to harvest the upper more tender portion of the stalks leaving the lower heavier and tougher growth in the field. It is another object to provide such an apparatus which will minimize the amount of injury to the severed product by entraining the severed product in an air stream. It is another object to provide an apparatus to harvest asparagus without damage or injury to the root system. It is an additional object to provide such an injuring apparatus which may be so adjusted as to avoid injury immature stalks which are not ready for harvesting. It is still a further object of this invention to provide an apparatus which will facilitate a rapid adjustment of the machine while in the field and during the actual harvesting operation to compensate for the constantly changing conditions of the asparagus stalks as the day of harvest advances.

It is still a further object of this invention to provide apparatus which will be essentially simple and inexpensive to manufacture and be particularly maintenance free. It is another object of this invention to have a harvesting device which is free of moving conveyor belts which constantly create problems of down time in the field due to debris snagging on the conveyor belt and halting the movement thereof. It is a further object of this invention to utilize essentially one rotating member, the height of which may be adjusted relative to the ground level to compensate for the different height location of the tender point on the asparagus stalk. It is a further object of this invention to provide structure which will facilitate a raising and lowering of a support bar relative to the tips of the paddles to again faciliate a proper snapping of the asparagus stalks during the harvesting operation.

SUMMARY OF THE INVENTION

In general, the objects and purposes of the invention are met by providing, in a machine for harvesting asparagus stalks, a wheel supported frame and means defining a pair of laterally spaced axially aligned discs and support means for rotatably supporting the pair of discs on the frame means. A plurality of flexible paddles are connected to and extend between the pair of discs with each of the paddles extending generally radially outward beyond the radial extremity of the wheel to define the tips of the paddles. Further, the paddles are spaced circumferentially around the periphery of the discs to define a cylindrically appearing paddle wheel configuration. A support bar is secured to the frame and extends beneath the paddle wheel configuration and is further vertically spaced from the tips of the paddles. A collecting bin is provided for collecting the severed asparagus stalks. A stationary slide is secured to the support bar and extends generally in an arcuate path between the support bar and the collecting means, the radius of the arc generally coinciding with the axis of rotation of the paddle wheel configuration so that the tips of the paddle means remain spaced from the stationary slide means. Selectively variable speed drive means are provided independent of the forward speed of the frame with transmission means being provided to operatively connect the variable speed drive means with the paddle wheel configuration to effect a rotational movement thereof in a direction so that the lowermost ones of the paddles are moved at a selected reversed horizontal velocity with respect to the wheel supported frame means. As a result, the speed of the variable speed drive means may be selected to correspond to the condition of the asparagus stalks at the time of harvest. While the paddles engage some of the asparagus stalks, the wind generated by the rotating paddle wheel is generally sufficient to cause the severed asparagus stalks to become entrained in the wind and be moved to the collecting bin to thereby minimize the engagement of the paddles with the severed stalk, and, consequently, minimizes to the severed stalk.

BRIEF DESCRIPTION OF THE DRAWINGS

Other objects and purposes of this invention will be apparent to persons acquainted with the problems associated with harvesting asparagus upon reading the following specification and inspecting the accompanying drawings, in which:

FIG. 3 is a sectional view taken along the line III—III of FIG. 2;

FIG. 4 is an enlarged sectional view taken along the line IV—IV of FIG. 2;

FIG. 6 is a sectional view taken along the line VI—VI of FIG. 4; and

FIGS. 7 to 9 illustrate the manner in which the asparagus stalk is snapped during a harvesting operation.

Figure 1:
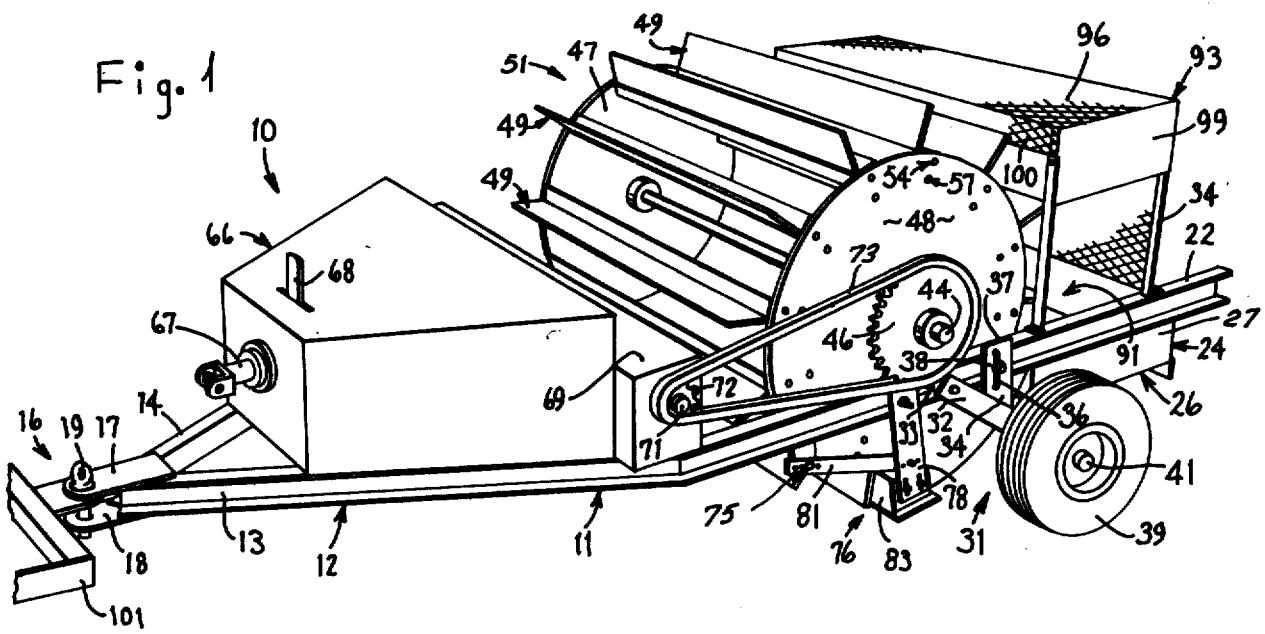
FIG. 1 is a perspective view of an asparagus harvesting machine embodying the invention.

Certain terminology will be used in the following description for convenience in reference only and will not be limiting. The words "up," "down," "right" and "left" will designate directions in the drawings to which reference is made. The words "forward" and "rearward" will refer to the direction of travel of the harvesting device, "forward" being the direction from right to left in FIGS. 1 and 2. The words "in" and "out" will refer to directions toward and away from, respectively, the geometric center of the device and designated parts thereof. Such terminology will include the words above specifically mentioned, derivatives thereof, and words of similar import.

DETAILED DESCRIPTION

Figure 2:
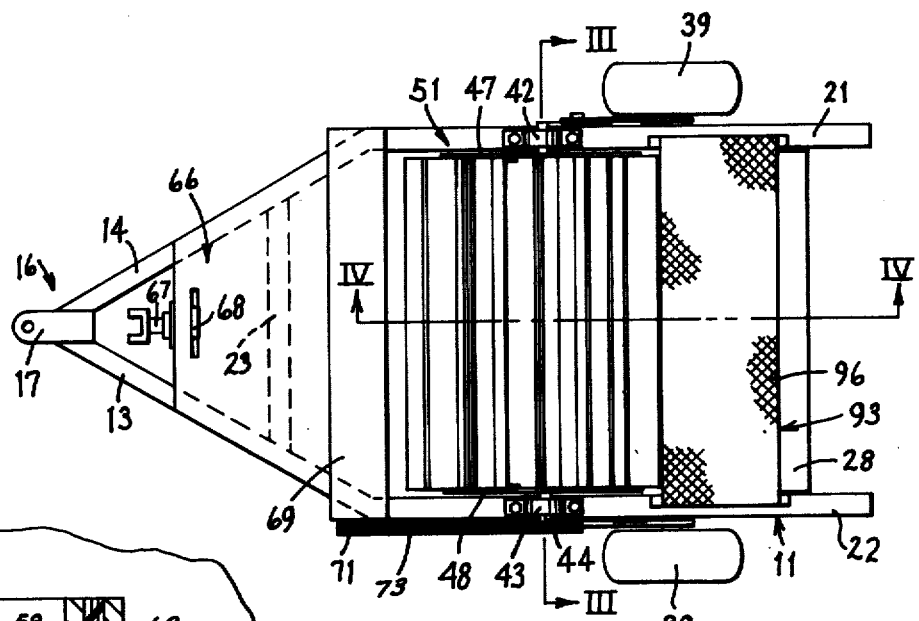
FIG. 2 is a top view of the asparagus harvesting machine.

A harvesting machine 10 is illustrated in FIGS. 1 and 2 and comprises a frame 11 having a tongue 12 consisting of a pair of converging arms 13 and 14 connected at the forwardmost end by a hitch assembly 16. The hitch assembly 16 is composed of a pair of vertically spaced plates 17 and 18 having axially aligned, vertically spaced openings therein for receipt of a hitch pin 19. The frame 11 is also composed of a pair of parallel arms 21 and 22 connected to the arms 13 and 14 of the tongue 12 at the forwardmost end and extending rearwardly therefrom. The frame 11 is made rigid by a cross piece 23 which is secured to and extends between converging the arms 13 and 14 on the tongue 12 of the harvesting machine 10. A cross piece assembly 24 is secured to and extends between the arms 21 and 22 adjacent the rear end thereof. The cross piece assembly 24 is composed of a U-shaped frame member 26 having vertical sidewalls, one sidewall 27 being illustrated in FIG. 1, secured to and extending downwardly from each of the arms 21 and 22. A horizontally extending bottom wall 28 (FIG. 4) connects the lowermost ends of the vertical sidewalls. The U-shaped frame member 26 also serves as a support for a collecting bin for collecting the severed asparagus stalks, which bin will be discussed in more detail below.

The frame 11 is supported on a pair of wheel assemblies 31 adjustably secured to the frame 11. More specifically, a support arm 32 (FIG. 1) is secured to both of the arms 21 and 22 by a bearing assembly 33. A bracket 34 is secured to the support arm 32 intermediate the ends and extends upwardly therefrom. An elongated arcuate slot 36 is provided in the bracket 34 and slidably receives a bolt 37 therein, which bolt 37 is fixedly secured to the arms 21 and 22 of the frame 11. A nut 38 is secured to the free end of the bolt 37 to lock the wheel assembly 31 in a selected elevated position. A wheel 39 is rotatably secured to the lower end of each of the arms 32 by a conventional axle and bearing assembly 41.

A pair of bearing blocks 42 and 43 are mounted on the arms 21 and 22, respectively, of the frame 11. A shaft 44 is rotatably mounted in the bearing blocks 42 and 43 and has a sprocket 46 fixedly secured to one end thereof, here the right end as illustrated in FIG. 3. A pair of axially spaced discs 47 and 48 are fixedly secured to the shaft 44 by a conventional hub connection and are rotatable therewith. The discs 47 and 48 are positioned closely adjacent the arms 21 and 22 to define a space therebetween.

A plurality of paddle assemblies 49 are secured to and extend between the discs 47 and 48. The paddle assemblies 49 are also spaced circumferentially around the discs as illustrated in FIG. 4. The plurality of paddle assemblies 49 mounted on the axially spaced discs 47 and 48 define what will be hereinafter referred to periodically as a paddle wheel configuration 51.

Figure 5:
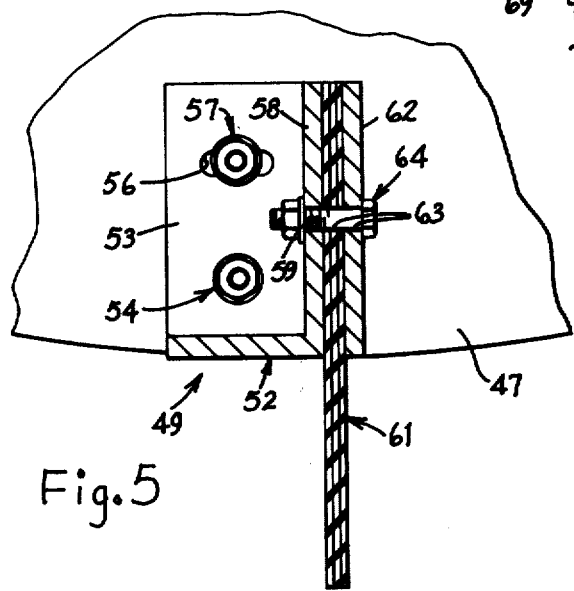
FIG. 5 is an enlarged fragmentary sectional view of a portion of a paddle construction illustrated in FIG. 4.

More specifically, the paddle assemblies 49 are each identical to one another and are composed of an L-shaped bar 52 (FIG. 5) which extends horizontally between the axially spaced discs 47 and 48. A bracket piece 53 is secured to the L-shaped bar adjacent both of the ends thereof so that the bracket pieces 53 extend in a plane generally parallel to the plane of the discs 47 and 48. Each bracket piece 53 has an opening therethrough for the receipt of a nut and bolt assembly 54 to secure the L-shaped bar 52 to the discs 47 and 48. Each bracket piece 53 also has an elongated arcuate slot 56 therein, the radius of the arc coinciding with the axis of the opening in the bracket pieces 53 which receive the nut and bolt assemblies 54. The arcuate slot 56 is also adapted to receive a nut and bolt assembly 57 therein. As a result of the foregoing construction, the bracket pieces 53 and, consequently, the L-shaped bar 52 are pivotal, when the nut and bolt assemblies 54 and 57 are loosened, about the axis of the nut and bolt assembly 54 to control the position of the paddle assembly 49 relative to the radius of the paddle wheel configuration 51. Each of the radially extending legs 58 of the L-shaped bars 52 has a plurality of openings 59 therethrough.

Each of the paddle assemblies 49 are composed of a strip of flexible materials, such as two or three ply belting 61. The belting 61 has a sufficient width to extend generally the full distance between the axially spaced discs 47 and 48 and a height sufficient to extend radially outwardly beyond the peripheral edges of the discs 47 and 48. Generally, the amount of belting 61 which extends radially outwardly from the peripheral edge of the discs 47 and 48 is greater then the length of the leg 58 of the L-shaped bars 52. A bar 62 extends horizontally between the discs 47 and 48 adjacent and parallel to the leg 58 of the L-shaped bars 52. Both the belting 61 and the bar 62 have a plurality of axially aligned openings 63 therein which are aligned with the openings 59 in the leg 58. Each of the aligned openings 59 and 63 are adapted to receive a nut and bolt assembly 64 therein to clamp the belting 61 between the bar 62 and the leg 58 of the L-shaped bar 52. Since the L- shaped bar 52 and bracket piece 53 are pivotal about the axis of the nut and bolt assembly 54, the angle of the belting 61 can be adjusted relative to the radius of the paddle wheel configuration 51.

Any conventional variable speed drive mechanism 66 can be used for rotatably driving the paddle wheel configuration 51 independent of the forward speed of the harvesting machine 10. For example, the drive mechanism 66 can have an input shaft 67 thereon which can be coupled to the variable speed power takeoff shaft on the conventional pulling implement not illustrated. On the other hand, the drive mechanism 66 may be a self-contained gasoline driven engine driving a hydraulic pump and hydraulic motors (not illustrated), the speed of which can be varied by means of a lever 68 to control the output speed of the pump. A transmission arrangement 69 has an output shaft 71 thereon and a sprocket 72 secured thereto for rotation therewith. The sprocket 72 is aligned with the sprocket 46 and has a chain 73 interconnecting same so that when the sprocket 72 is driven by the output shaft 71 from the transmission arrangement 69, the sprocket 46 will drive the shaft 44 for rotation and, consequently, will rotatably drive the paddle wheel configuration 51. The paddle wheel configuration is driven in a counterclockwise direction (FIG. 4) so that the edge portions of the belting 61 of the lowermost ones of the paddle assemblies 49 move in a reverse direction to the forward direction of travel of the harvesting machine 10 during use thereof.

A support bar assembly 76 is mounted beneath the paddle wheel configuration 51. The support bar assembly 76 is composed of a pair of bracket arms 77 and 78 pivotally secured to the frame members 21 and 22, respectively. Each of the bracket arms 77 and 78 has a vertically elongated slot 82 (FIG. 6) therein adjacent the lower ends thereof. The pivotal support mechanism is composed of a spacer 79 (FIG. 3) and a nut and bolt assembly for holding the bracket arms 77 and 78 against the spacers 79 to prevent the bracket arms 77 and 78 from contacting the frame members 21 and 22. The pivotal bracket arms 77 and 78 are stabilized by a lever arm 81 which is secured to the frame members 21 and 22 by a nut and bolt assembly 75 in front of the point of connection of the bracket arms 77 and 78 to the frame members 21 and 22. The lever arm 81 extends between the frame members 21 and 22 and the bracket arms 77 and 78 and are connected to the bracket arms 77 and 78 at a location below the pivot point of the support therefor by a nut and bolt assembly 80. The forwardmost end of the lever arm 81 has a plurality of holes therein to facilitate an adjustment of the position of the lever arm 81 and, consequently, the angle of the bracket arms 77 and 78 relative to the frame member 21 and 22.

The support bar assembly 76 is further composed of a stationary, generally horizontally extending flat plate 83 extending horizontally between the bracket arms 77 and 78 and have bracket members 84 extending upwardly therefrom adjacent the lower extremity of the bracket arms 77 and 78. Openings 86 (FIG. 6) are provided in the bracket members 84 and are alignable with the vertically elongated slots 82 in the lower extremity of the bracket arms 77 and 78. A nut and bolt assembly 87 is received in the aligned openings 82 and 86. Accordingly, a loosening of the nut and bolt assembly 87 can facilitate a vertically elevatable movement of the plate 83 relative to the paddle wheel configuration 51, particularly the edge portions of the belting 61, to vary the distance D (FIG. 6) therebetween.

An arcuately shaped slide 88 is secured at the forward edge thereof to the plate 83. The radius of the arc is approximately coincident with the axis of rotation of the shaft 44 on the paddle wheel configuration 51. The arcuate slide 88 extends rearwardly from the plate 83 and upwardly to a position adjacent a horizontal plane containing the axis of the shaft 44 whereat a flange 89 extends downwardly from the slide 88 into a vertically spaced relation to the bottom wall 28 of the U-shaped frame member 26. The arcuate slide 88 is also positioned closely adjacent the edge portions of the flexible belting 61 so that the severed product will be engaged and moved by the flexible belting on the arcuate plate 88 toward the upper edge of the arcuate slide 88. Yet, however, the edge portions of the flexible belting 61 preferably do not touch the arcuate slide 88.

A collecting bin 91 having four vertical sidewalls and a bottomwall is removably placed on the bottom wall 28 of the U-shaped frame member 26. The front wall 92 of the bin 91 is positionable beneath the flange 89. As a result, severed asparagus stalks will be slid along the arcuate slide 88 to the upper edge thereof after which time the severed asparagus stalks will drop into the bin 91.

A screen housing assembly 93 is connected to the frame members 21 and 22. The screen housing assembly 93 is composed of a rear wall 94 and a top wall 96 disposed at a right angle to each other. The rear wall 94 is mounted rearwardly of the paddle wheel configuration 51 and is preferably positioned inside the rear wall 97 of the bin 91 as illustrated in FIG. 4. Sidewalls 98 and 99 and a front wall 100 may be added where necessary to prevent the escape of severed stalks from the screen housing assembly.

OPERATION

Although the operation of the asparagus harvesting machine 10 will be apparent to persons skilled in this art, the operation will be described in detail hereinbelow for convenience.

After the initial adjustments are made to the machine, such as spacing the plate 83 vertically below the edge portions of the flexible belting 61 a distance, for example, generally equal to about 1 inch and adjusting the forwardmost edge of the plate 83 about 1½ inches in front of a vertical plane containing the axis of rotation of the paddle wheel configuration 51 and adjusting the elevation of the plate 83 relative to the ground by adjustment of the wheel assemblies 31, the unit may be hitched to an elevatable mechanism 101 on the rear end of a tractor, for example, by the pin 19 and pulled in a forward direction. The paddle wheel configuration 51 is rotated in a counterclockwise direction as illustrated by the arrow in FIG. 4 and at a selected speed to accommodate a snapping of the asparagus stalks as the asparagus harvesting machine 10 is moved in the forward direction. The severed asparagus stalks S (FIG. 9) are moved, after being snapped at the tender point T (FIG. 8), both by the flexible belting 61 along the arcuate slide 88 and by entrainment in the wind generated by the paddle wheel for eventual deposit into the collecting bin 91.

The drive mechanism 66 for rotatably driving the paddle wheel configuration 51 has a variable speed output for driving the paddle wheel configuration 51 at a selected speed depending upon the condition of the asparagus during the time of harvest. One of the major problems encountered by the asparagus grower is the constantly changing condition of the asparagus stalk as the day develops. In the morning hours, when moisture is still present in the stalk, the characteristics of the asparagus stalks for effecting a snapping during harvest is different from the conditions of the asparagus stalk in the afternoon hours when the moisture has been removed from the stalk by action of the sun thereon. As a result, the asparagus prior to its being snapped is more limp in the afternoon hours than it is during the morning hours. As a result, the harvesting machine must be adapted for rapid change in the field to accommodate any alteration in the condition of the asparagus prior to its being harvested. Our provision of a variable speed mechanism, either the variable speed power takeoff from the pulling implement or an independently driven system, such as a gasoline engine driving a hydraulic pump and hydraulic motors, permits a rapid change in the field to accommodate varying picking conditions.

Another interesting feature of the invention is that by spacing the edge portions of the flexible belting 61 above the plate 83, the thin willowing wisps of asparagus will not be snapped at all but will remain in the field. This is desirable because these small thin asparagus stalks are undesirable products. Further, if weather should prevent the further picking of crops for a day or more and the asparagus stalks are permitted to grow to a height greater than what would be normal if picking should be accomplished everyday, the wheel assemblies 31 may be adjusted to raise the plate 83 to a level higher than is illustrated in the drawings. This will also facilitate a saving of the next day's crop due to the fact that the tips of the next day's crop will not be struck by the plate 83 during its movement over the field.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machine for harvesting asparagus stalks having a tender part located above the ground and adapted to be moved in a forward horizontal direction, comprising:

means defining a wheel supported frame;
support means mounted on said wheel supported frame means;
means defining a paddle wheel configuration rotatably mounted on said support means, said paddle wheel configuration means including a plurality of flexible paddle means extending generally radially outwardly from said support means and have outer edge portions spaced circumferentially around the periphery of said paddle wheel configuration;
means defining a stationary, generally horizontally extending plate means having a straight leading edge secured to said wheel supported frame means and extending beneath said paddle wheel configuration and being vertically spaced from the ground and from said edge portions of said paddle means, said leading edge being located forward of a vertical plane containing the axis of rotation of said paddle wheel configuration;
collecting means mounted on said frame means for collecting the severed asparagus stalks;
stationary slide means secured to said plate means and extending generally in an arcuate path between said plate means and said collecting means, the radius of said arc generally coinciding with the axis of rotation of said paddle wheel configuration so that said edge portions of said paddle means remain spaced from said stationary slide means but yet capable of effecting a transfer of the severed asparagus stalks to said collecting means; and
selectively variable speed drive means independent of the forward speed of said wheel supported frame means and transmission means operatively connecting said variable speed drive means with said paddle wheel configuration to effect a rotational movement thereof in a direction wherein the lowermost ones of said paddle means are moved at a selected horizontal velocity with respect to said wheel supported frame means, said paddle means engaging said asparagus stalks at the upper portion thereof, said leading edge of said plate means engaging said asparagus stalks at said vertically spaced distance below said edge portions of said paddle means and said vertically spaced distance above the ground to effect a snapping off of said asparagus stalks at the location of said tender part above the ground whereby the speed of said variable speed drive means may be selected to correspond to the condition of the asparagus stalks at the time of harvest.

2. A machine for harvesting asparagus stalks according to claim 1, wherein said plate means is a generally flat plate having said straight leading edge thereon and adjustment means for facilitating an adjustment of the spacing between said edge portions of said paddle means on said paddle wheel configuration from said flat plate.

3. A machine for harvesting asparagus stalks according to claim 1, wherein each of said paddle means include flexible strips of material and means for securing said flexible strips of material to said pair of discs.

4. A machine for harvesting asparagus stalks according to claim 1, wherein said wheel supported frame means includes adjustable wheel assemblies which raise and lower said frame means relative to the ground level.

5. A machine for harvesting asparagus stalks according to claim 1, wherein said paddle wheel configuration includes a pair of laterally spaced axially aligned discs rotatably mounted on said support means, said plurality of flexible paddle means being connected to and extending between said pair of discs.

6. A machine for harvesting asparagus stalks according to claim 1, wherein the speed of movement of said paddle means over said slide means is sufficient to entrain the severed asparagus stalks in the wind flow generated by the movement of said paddle means over said slide means to convey the severed asparagus stalks to said collecting means.

* * * * *